(12) United States Patent
Roberts et al.

(10) Patent No.: US 9,359,972 B2
(45) Date of Patent: Jun. 7, 2016

(54) MULTI AXIS SLIDE CARRIAGE SYSTEM

(75) Inventors: Steven D. Roberts, Moodus, CT (US);
Paul R. Senofonte, Portland, CT (US)

(73) Assignee: United Technologies Corporation,
Farmington, CT (US)

( * ) Notice: Subject to any disclaimer, the term of this patent is extended or adjusted under 35 U.S.C. 154(b) by 453 days.

(21) Appl. No.: 13/222,789

(22) Filed: Aug. 31, 2011

(65) Prior Publication Data
US 2013/0048807 A1 Feb. 28, 2013

(51) Int. Cl.
| | |
|---|---|
| *B63H 11/10* | (2006.01) |
| *B64C 15/00* | (2006.01) |
| *F02K 1/09* | (2006.01) |
| *F02K 1/76* | (2006.01) |
| *B05B 12/00* | (2006.01) |
| *B64C 9/38* | (2006.01) |
| *A47B 96/06* | (2006.01) |
| *A47F 5/00* | (2006.01) |
| *A47F 5/08* | (2006.01) |
| *A47H 1/10* | (2006.01) |
| *E04G 3/00* | (2006.01) |
| *A47G 29/02* | (2006.01) |
| *E04G 3/20* | (2006.01) |
| *E06B 7/28* | (2006.01) |
| *F16M 13/00* | (2006.01) |
| *F02K 3/02* | (2006.01) |
| *F16C 29/02* | (2006.01) |
| *F02K 1/72* | (2006.01) |
| *B64D 33/04* | (2006.01) |
| *F02K 1/12* | (2006.01) |
| *B64D 29/06* | (2006.01) |
| *F02K 1/08* | (2006.01) |

(52) U.S. Cl.
CPC . *F02K 1/09* (2013.01); *F02K 1/763* (2013.01);
*B64D 29/06* (2013.01); *B64D 33/04* (2013.01);
*F02K 1/08* (2013.01); *F02K 1/12* (2013.01);
*F02K 1/72* (2013.01)

(58) Field of Classification Search
CPC ........ F16C 29/00; F16C 29/001; F16C 29/02; F16C 29/004; F16C 29/005; F16C 29/614; F02K 1/08; F02K 1/12; F02K 1/72; B64D 29/06; B64D 33/04
USPC ................. 248/420, 429, 244, 295.11, 298.1; 239/265.33–265.369, 265.19; 60/232, 60/771, 796, 799, 226.2; 403/59–61; 411/424; 384/29; 244/110 B
See application file for complete search history.

(56) References Cited

U.S. PATENT DOCUMENTS

| | | | |
|---|---|---|---|
| 4,442,987 A * | 4/1984 | Legrand et al. | 244/110 B |
| 4,541,673 A * | 9/1985 | Greiert | 384/29 |

(Continued)

FOREIGN PATENT DOCUMENTS

WO     WO 2009150445 A1 * 12/2009    ................ B64C 9/16

*Primary Examiner* — Syed A Islam
*Assistant Examiner* — Taylor Morris
(74) *Attorney, Agent, or Firm* — O'Shea Getz P.C.

(57) ABSTRACT

A multi axis slide carriage system includes a channeled track, a slide, a shaft and a slide carriage bracket. The channeled track extends along a first axis. The slider slides along the first axis within the channeled track, and includes a slider segment aperture extending therein along a second axis. The shaft includes a slider segment connected to a carriage bracket segment. The slider segment slides along the second axis within the slider segment aperture. The slide carriage bracket is positioned adjacent to the channeled track, and is connected to the carriage bracket segment.

17 Claims, 3 Drawing Sheets

(56) References Cited

U.S. PATENT DOCUMENTS

| | | |
|---|---|---|
| 4,669,687 A | 6/1987 | Rudolph |
| 5,118,120 A * | 6/1992 | Drerup et al. ............... 277/628 |
| 5,484,105 A * | 1/1996 | Ausdenmoore et al. ... 239/127.3 |
| 6,551,006 B2 * | 4/2003 | Kincaid et al. ............... 403/130 |
| 6,592,074 B2 | 7/2003 | Dehu et al. |
| 7,222,819 B1 | 5/2007 | Kelnhofer |
| 7,721,551 B2 | 5/2010 | Hanson |
| 7,857,263 B2 | 12/2010 | Gartelmann et al. |
| 2005/0217623 A1 | 10/2005 | Truelove et al. |
| 2009/0140497 A1 | 6/2009 | Roberts et al. |
| 2010/0158605 A1 | 6/2010 | Gargaro, III et al. |
| 2011/0016880 A1 | 1/2011 | Roberts et al. |
| 2011/0120078 A1 | 5/2011 | Schwark, Jr. et al. |

\* cited by examiner

MULTI AXIS SLIDE CARRIAGE SYSTEM

This invention was made with government support under Contract No. F33657-03-C-2011 awarded by the United States Air Force. The government may have certain rights in the invention.

BACKGROUND OF THE INVENTION

1. Technical Field

The present invention relates to the field of slide carriage systems and, in particular, to a slide carriage system having a plurality of degrees of freedom that may be used in a gas turbine engine.

2. Background Information

Slide carriage systems may be used in aerospace, industrial, consumer and various other applications. A slide carriage system, for example, may be used to slideably mount a sliding exhaust nozzle panel onto a frame of a gas turbine engine. A typical slide carriage system includes a plurality of mounting assemblies. Each mounting assembly may include a slide carriage bracket with a rolling element that moves within a track.

During engine operation, the nozzle panel may be subject to changing bending moments that may warp the nozzle panel. The aforedescribed slide carriage system, however, may be subject to relatively high internal stresses within and contact stresses between its components. The internal stresses and contact stresses may increase slide carriage component wear and failure.

SUMMARY OF THE DISCLOSURE

According to an aspect of the invention, a multi axis slide carriage system includes a channeled track, a slide, a shaft and a slide carriage bracket. The channeled track extends along a first axis. The slider slides along the first axis within the channeled track, and includes a slider segment aperture extending therein along a second axis. The shaft includes a slider segment connected to a carriage bracket segment. The slider segment slides along the second axis within the slider segment aperture. The slide carriage bracket is positioned adjacent to the channeled track, and is connected to the carriage bracket segment.

The foregoing features and the operation of the invention will become more apparent in light of the following description and the accompanying drawings.

DETAILED DESCRIPTION OF THE INVENTION

Figure 1:
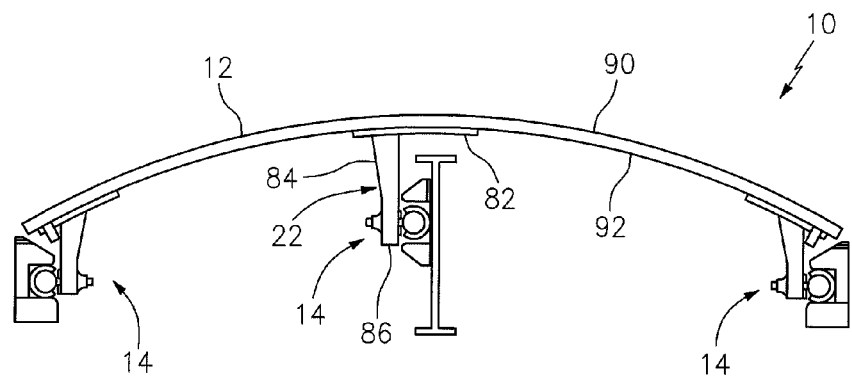
FIG. 1 is a front view illustration of a multi axis slide carriage system.
Figure 2:
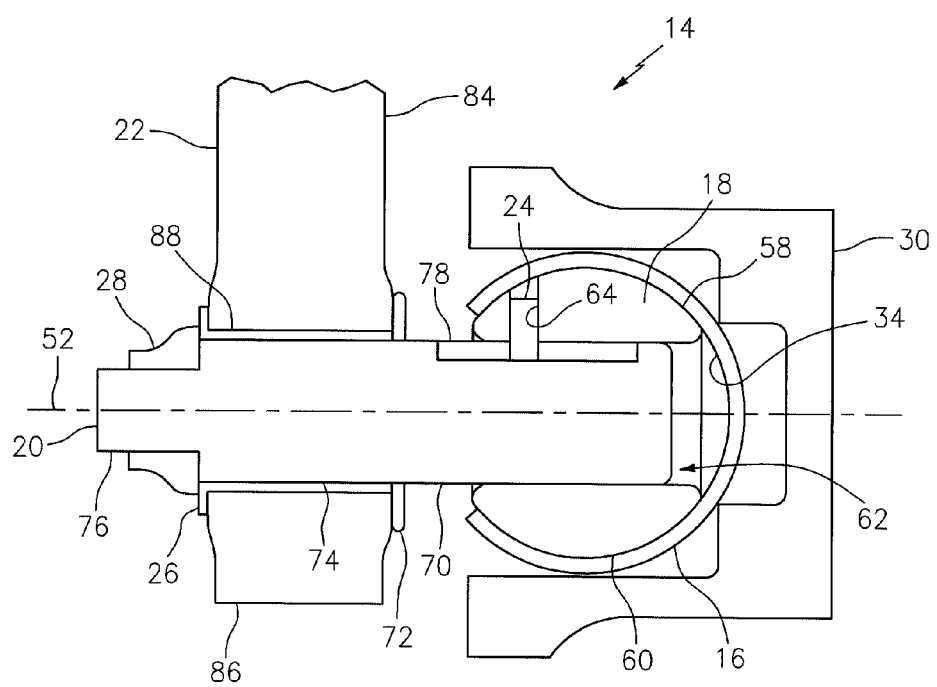
FIG. 2 is a partial cross-sectional illustration an embodiment of a multi axis slide carriage system.

FIG. 1 is a front view illustration of a multi axis slide carriage system 10 for a gas turbine engine. The slide carriage system 10 includes a sliding panel 12 (e.g., a sliding nozzle panel for a variable area exhaust nozzle) and one or more mounting assemblies 14. Referring to FIG. 2, each mounting assembly 14 includes a channeled track 16, a slider 18, a shaft 20, a slide carriage bracket 22, a retainer pin 24, a bushing 26 and a nut 28.

Figure 3:
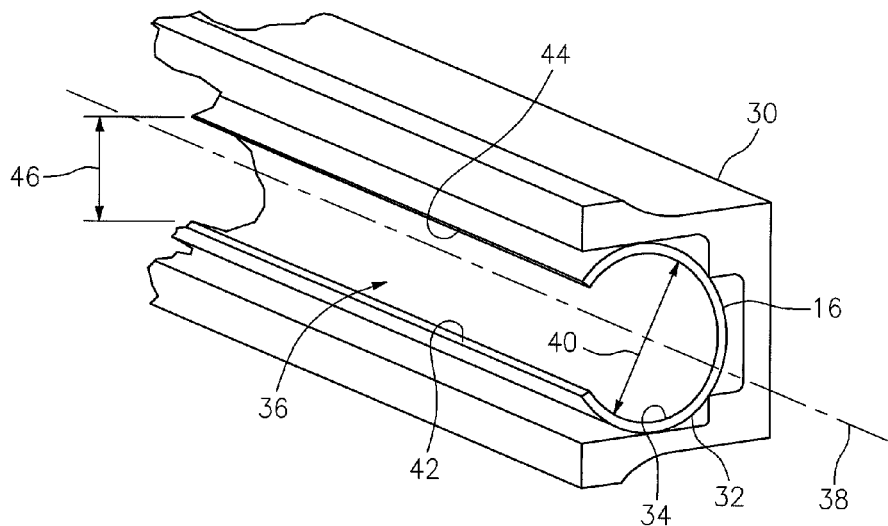
FIG. 3 is a partial perspective illustration of a C-channeled track disposed within a channeled mounting track.

FIG. 3 is a partial perspective illustration of the channeled track 16 (e.g., a C-channeled track) disposed within and connected to a channeled mounting track 30. The channeled track 16 includes a track sidewall 32 with a curved interior track surface 34 that forms a track aperture 36. The track sidewall 32 may include a C-channeled cross-sectional geometry that extends along a first axis 38. The interior track surface 34 extends circumferentially around the first axis 38, for example at a substantially constant diameter 40, between a first track sidewall end 42 and a second track sidewall end 44. The track aperture 36 has a height 46 that extends between the first track sidewall end 42 and the second track sidewall end 44. The height 46 is less than the diameter 40.

Figure 4:
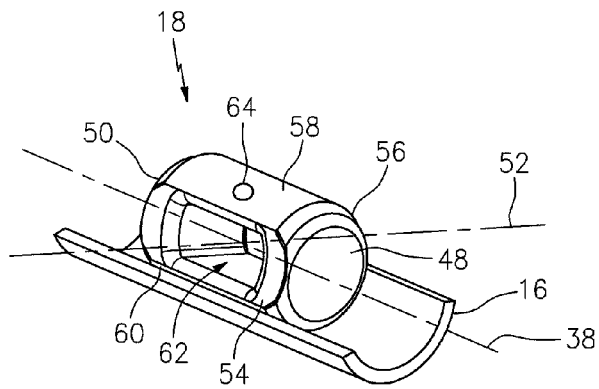
FIG. 4 is a perspective illustration of a slider on a portion of the C-channeled track illustrated in FIG. 3.

FIG. 4 is a perspective illustration of the slider 18 on a portion of the channeled track 16. The slider 18 extends along the first axis 38 between a first slider end 48 and a second slider end 50. The slider 18 extends along a second axis 52 between a first slider side 54 and a second slider side 56, where the second axis 52 is substantially perpendicular to the first axis 38. The slider 18 includes an arcuate first exterior slider surface 58, an arcuate second exterior slider surface 60, a slider segment aperture 62 and a retainer pin aperture 64. Each of the exterior slider surfaces 58, 60 extends along the first axis 38 between the first slider end 48 and the second slider end 50. Each of the exterior slider surfaces 58, 60 also extends circumferentially around the first axis 38, for example at a substantially constant diameter, between the first slider side 54 and the second slider side 56. The slider segment aperture 62 extends along the second axis 52 between the first slider side 54 and the second slider side 56. The retainer pin aperture 64 extends from the first exterior slider surface 58 to the slider segment aperture 62.

Figure 5:
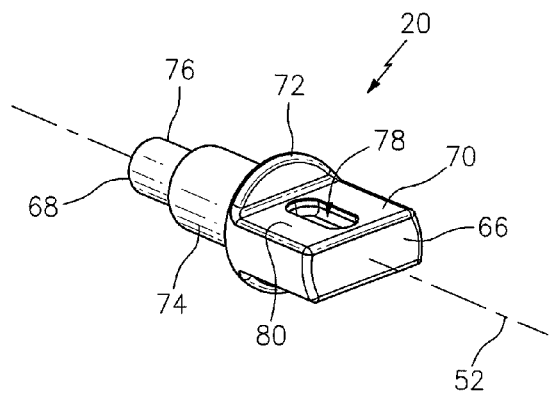
FIG. 5 is a perspective illustration of a shaft.

FIG. 5 is perspective illustration of the shaft 20. The shaft 20 extends along the second axis 52 between a first shaft end 66 and a second shaft end 68. The shaft 20 includes a slider segment 70, a shaft shoulder segment 72, a carriage bracket segment 74 and a threaded shaft segment 76. The slider segment 70 has a substantially rectangular cross-sectional geometry that extends axially between the first shaft end 66 and the shaft shoulder segment 72. The slider segment 70 includes an elongated retainer pin aperture 78 that extends at least partially into a side 80 thereof. The shaft shoulder segment 72 is connected axially between the slider segment 70 and the carriage bracket segment 74. The carriage bracket segment 74 has a substantially circular cross-sectional geometry that extends axially between the shaft shoulder segment 72 and the threaded shaft segment 76. The threaded shaft segment 76 extends axially between the carriage bracket segment 74 and the second shaft end 68.

Referring to FIG. 1, the slide carriage bracket 22 includes a carriage base 82 and a carriage arm 84 that extends from the carriage base 82 to a distal end 86. Referring to FIG. 2, the carriage arm 84 includes a carriage bracket segment aperture 88 located proximate the distal end 86. The carriage bracket segment aperture 88 extends through the carriage arm 84 along the second axis 52.

Referring still to FIG. 2, the slider segment 70 extends into the slider segment aperture 62. The retainer pin 24 extends into the retainer pin aperture 64 and the elongated retainer pin aperture 78. The slider 18 is positioned within the channeled track 16, and the exterior slider surfaces 58 and 60 slideably engage the interior track surface 34. The carriage bracket segment 74 extends through the carriage bracket segment aperture 88. The bushing 26 is arranged between the carriage bracket segment 74 and the carriage bracket segment aperture 88. The nut 28 is mounted on the threaded shaft segment 76 and axially secures the carriage arm 84 against the shaft shoulder segment 72. Referring to FIG. 1, the carriage base 82 of each mounting assembly 14 is respectively connected to the sliding panel 12.

Referring still to FIG. 1, during engine operation, gas pressure on an outside surface 90 of the sliding panel 12 may be different than (e.g., less than) gas pressure on an inside surface 92 of the sliding panel 12 resulting in a pressure differential across the sliding panel 12. The pressure differential may change as a function of engine speed, altitude, etc. As the pressure differential changes, the sliding panel 12 may dither, flex, warp, etc. Referring now to FIG. 2, each mounting assembly 14 may accommodate panel movement by permitting one or more of its components to translate along and/or rotate about one or more axes. The slider 18, for example, may translate along and/or rotate (e.g., between about −10 and 10 degrees) about the first axis 38 (see FIG. 4). The shaft 20 may translate along the second axis 52, and the slide carriage bracket 22 may rotate about the second axis 52. By permitting the mounting assembly components to translate and/or rotate, the mounting assembly 14 may reduce internal stresses within and contact stresses between its components relative to a mounting assembly with a rolling element as described above in the background.

Figure 6:
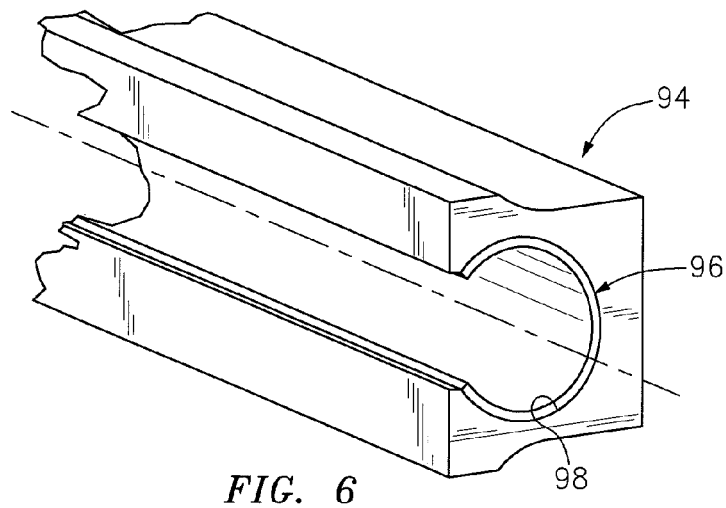
FIG. 6 is a partial perspective illustration of an alternate embodiment C-channeled track.

FIG. 6 is a partial perspective illustration of an alternate embodiment channeled track 94. The channeled track 94 is configured to replace the channeled track 16 and the channeled mounting track 30 illustrated in FIG. 3. The channeled track 94 may include a liner 96 (e.g., a fibroid liner or a composite liner) disposed on an interior track surface 98 thereof. The liner 96 material (e.g., Inco 625 or Inco 718) may be selected to reduce sliding friction between the slider and the channeled track 94, function as a sacrificial wear element between the slider and the channeled track 94, etc. Alternately, the channeled track 94 may include a lubricant and/or surface hardener coating (e.g., a chromium carbide coating) applied to the interior track surface 98.

Figure 7:
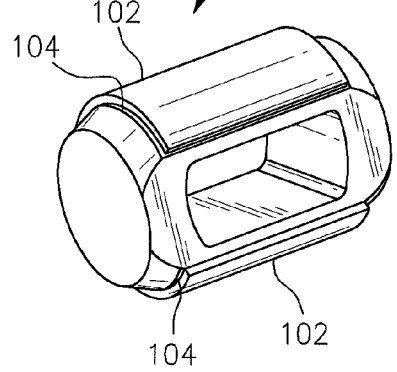
FIG. 7 is a perspective illustration of an alternate embodiment slider.

FIG. 7 is a perspective illustration of an alternate embodiment slider 100. In contrast to the slider 18 illustrated in FIG. 4, the slider 100 includes one or more liners 102 (e.g., fibroid liners or composite liners) disposed on exterior slider surfaces 104 thereof. The liners 102 material (e.g., titanium) may be selected to reduce sliding friction between the slider 18 and the channeled track, function as a sacrificial wear element between the slider 18 and the channeled track, etc. Alternately, the slider 18 may include a lubricant and/or surface hardener coating applied to the exterior slider surfaces 104.

Figure 8:
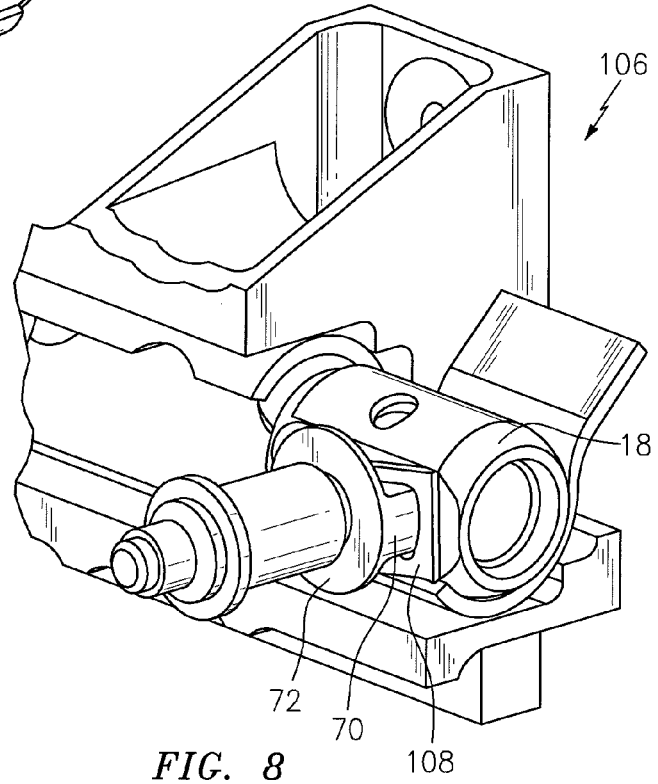
FIG. 8 is a partial perspective illustration of a mounting assembly.

FIG. 8 is a partial perspective illustration of an alternate embodiment mounting assembly 106. In contrast to the mounting assembly 14 illustrated in FIG. 2, the mounting assembly 106 also includes a spring 108 (e.g., a leaf spring) disposed on the slider segment 70 that biases the slider 18 away from the shaft shoulder segment 72.

In alternate embodiments, the channeled track 16 may be configured such that the slider 18 may translate along and/or rotate (e.g., between about −45 and 45 degrees) about the first axis.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A multi axis slide carriage system, comprising
a channeled track extending along a first axis;
a slider that slides along the first axis within the channeled track, wherein the slider comprises a slider segment aperture extending therein along a second axis and having a generally rectangular cross-section that is perpendicular relative to the second axis;
a shaft comprising a slider segment connected to a carriage bracket segment, wherein the slider segment slides along the second axis within the slider segment aperture; and
a slide carriage bracket positioned adjacent to the channeled track, and connected to the carriage bracket segment;
wherein the slide carriage bracket is rotatably connected to the carriage bracket segment.

2. The system of claim 1, wherein the channeled track comprises a C-channeled track.

3. The system of claim 1, wherein the slide carriage bracket comprises a carriage bracket segment aperture that extends therein along a third axis, wherein the carriage bracket segment extends into the carriage bracket segment aperture.

4. The system of claim 3, further comprising a bushing arranged between the carriage bracket segment and the carriage bracket segment aperture.

5. The system of claim 3, wherein the third axis is substantially coincident with the second axis.

6. The system of claim 1, wherein the shaft further comprises a shaft shoulder segment connected between the carriage bracket segment and the slider segment.

7. The system of claim 6, further comprising a leaf spring that biases the slider away from the shaft shoulder segment.

8. The system of claim 6, wherein the shaft further comprises a threaded shaft segment, wherein the carriage bracket segment extends between the shaft shoulder segment and the threaded shaft segment, and wherein a nut is mounted on the threaded shaft segment that axially secures the slide carriage bracket against the shaft shoulder segment.

9. The system of claim 1, wherein the slider segment comprises a substantially rectangular cross-sectional geometry, and wherein the carriage bracket segment comprises a substantially circular cross-sectional geometry.

10. The system of claim 1, wherein the second axis is substantially perpendicular to the first axis.

11. The system of claim 1, wherein the channeled track is disposed within a channeled mounting track.

12. The system of claim 1, wherein the channeled track comprises an interior track surface, wherein the slider comprises an exterior slider surface that slideably engages the interior track surface, and wherein at least one of the interior track surface and the exterior slider surface comprises at least one of a lubricant coating and surface hardener coating.

13. The system of claim 1, wherein the channeled track comprises an interior track surface, wherein the slider comprises an exterior slider surface, wherein a liner is disposed on at least one of the interior track surface and the exterior slider surface, and wherein the exterior slider surface engages the interior track surface through the liner.

14. The system of claim 1, further comprising a sliding panel for a gas turbine engine, wherein the sliding panel is connected to the slide carriage bracket.

15. A multi axis slide carriage system, comprising
a channeled track extending along a first axis;

a slider that slides along the first axis within the channeled track, wherein the slider comprises a slider segment aperture extending therein along a second axis and having a generally rectangular cross-section that is perpendicular relative to the second axis;

a shaft comprising a slider segment connected to a carriage bracket segment, wherein the slider segment slides along the second axis within the slider segment aperture; and a slide carriage bracket positioned adjacent to the channeled track, and connected to the carriage bracket segment;

wherein the slider rotates about the first axis between minus forty five and forty five degrees.

16. The system of claim 15, wherein the channeled track comprises an interior track surface that extends circumferentially partially around the first axis from a first track sidewall end to a second track sidewall end, and wherein the slider comprises a circumferentially extending exterior slider surface that slideably engages the interior track surface.

17. A multi axis slide carriage system, comprising
a channeled track extending along a first axis;
a slider that slides along the first axis within the channeled track, wherein the slider comprises a slider segment aperture extending therein along a second axis and having a generally rectangular cross-section that is perpendicular relative to the second axis;

a shaft comprising a slider segment connected to a carriage bracket segment, wherein the slider segment slides along the second axis within the slider segment aperture; and a slide carriage bracket positioned adjacent to the channeled track, and connected to the carriage bracket segment;

wherein the slider segment comprises an elongated retainer pin aperture that extends therein, and wherein a retainer pin extends from the slider and into the retainer pin aperture, and limits relative movement along the second axis between the slider segment and the slider.

* * * * *